(12) United States Patent
Zhang et al.

(10) Patent No.: US 11,790,584 B2
(45) Date of Patent: Oct. 17, 2023

(54) IMAGE AND TEXT TYPESETTING METHOD AND RELATED APPARATUS THEREOF

(71) Applicant: Huawei Technologies Co., Ltd., Shenzhen (CN)

(72) Inventors: Yundie Zhang, Shenzhen (CN); Liang Hu, Shenzhen (CN); Liwei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 17/435,241

(22) PCT Filed: Feb. 26, 2020

(86) PCT No.: PCT/CN2020/076698
§ 371 (c)(1),
(2) Date: Aug. 31, 2021

(87) PCT Pub. No.: WO2020/177584
PCT Pub. Date: Sep. 10, 2020

(65) Prior Publication Data
US 2022/0139013 A1 May 5, 2022

(30) Foreign Application Priority Data

Mar. 1, 2019 (CN) .......................... 201910156945.5

(51) Int. Cl.
*G06T 11/00* (2006.01)
*G06T 11/60* (2006.01)
(Continued)

(52) U.S. Cl.
CPC ................ *G06T 11/60* (2013.01); *G06T 7/66* (2017.01); *G06T 7/90* (2017.01); *G06T 11/001* (2013.01); *G06V 10/462* (2022.01); *G06V 40/16* (2022.01)

(58) Field of Classification Search
CPC ......... G06T 11/001; G06T 11/60; G06T 7/90; G06T 5/00; G06T 7/11; G06T 7/13;
(Continued)

(56) References Cited

U.S. PATENT DOCUMENTS 6,959,121 B2  10/2005  Kumazawa
10,956,793 B1 *  3/2021  Wang .................. G06F 16/9038
(Continued)

FOREIGN PATENT DOCUMENTS

CN  101188018 A  5/2008
CN  102682457 A  9/2012
(Continued)

OTHER PUBLICATIONS

Tang Youbao, Research on Visual Saliency Detection Method and Its Application, 2016, with an English Abstract, total 134 pages.
(Continued)

*Primary Examiner* — Wesner Sajous
(74) *Attorney, Agent, or Firm* — Conley Rose, P.C.

(57) ABSTRACT

A method includes determining a first importance measurement value of a pixel in an image, obtaining at least one text box area stacked on the image, obtaining, based on first importance measurement value of a pixel in a background image corresponding to each text box area a second importance measurement value of a background image corresponding to each text box area, obtaining an importance measurement value gravity center or an importance measurement value mass center of the image based on the first importance measurement value, determining, based on a preset principle and a location relationship between the importance measurement value gravity center and a central area of the image or a location relationship between the importance measurement value mass center and a central area of the image, information about a balance degree value
(Continued)

of each text box area relative to the image, and selecting, from the at least one text box area, one text box area to typeset a word.

20 Claims, 5 Drawing Sheets (51) Int. Cl.
*G06T 7/11* (2017.01)
*G06T 7/90* (2017.01)
*G06T 7/66* (2017.01)
*G06V 10/46* (2022.01)
*G06V 40/16* (2022.01)
*G06V 20/62* (2022.01)
*G06V 10/54* (2022.01)
*G06V 20/56* (2022.01)
*G06V 10/44* (2022.01)
*G06F 40/131* (2020.01)
*G06F 40/10* (2020.01)
*G06F 40/103* (2020.01)
*H04N 5/57* (2006.01)
*H04N 5/445* (2011.01)
*H04N 5/45* (2011.01)
*H04N 9/74* (2006.01)

(58) Field of Classification Search
CPC .......... G06T 7/187; G06T 7/194; G06T 7/60; G06T 7/66; G06V 10/462; G06V 40/16; G06V 20/168; G06V 20/62; G06V 10/56; G06V 10/54; G06V 10/44; G06V 10/80; G06F 40/131; G06F 40/10; G06F 40/103; G06F 18/28; G06F 18/214; G06F 18/211; G06F 18/2113; G06F 18/22; G09G 5/92; G09G 5/24; G09G 5/26; G09G 5/28; G09G 5/30; G09G 5/377; G09G 5/373; H04N 1/58; H04N 1/60; H04N 5/57; H04N 5/445; H04N 5/45; H04N 9/74
USPC ........................................................ 345/589
See application file for complete search history.

(56) References Cited

U.S. PATENT DOCUMENTS

| | | |
|---|---|---|
| 2006/0070026 A1 | 3/2006 | Balinsky et al. |
| 2013/0314441 A1 | 11/2013 | Grasset et al. |
| 2015/0095852 A1* | 4/2015 | Hoerentrup ........... G06T 11/001 |
| | | 715/841 |
| 2015/0262428 A1 | 9/2015 | Tatzgern et al. |
| 2020/0253527 A1* | 8/2020 | Ellison .................. A61B 5/165 |

FOREIGN PATENT DOCUMENTS

| | | | |
|---|---|---|---|
| CN | 104966285 A | 10/2015 | |
| CN | 105426846 A | 3/2016 | |
| CN | 105874449 A | 8/2016 | |
| CN | 107103635 A | 8/2017 | |
| CN | 108133169 A | 6/2018 | |
| CN | 108389208 A | 8/2018 | |
| CN | 108764352 A | 11/2018 | |
| CN | 109035370 A | 12/2018 | |
| CN | 109062885 A | 12/2018 | |
| CN | 109117845 A | 1/2019 | |
| CN | 110009712 A | 7/2019 | |
| EP | 0740263 A2 * | 4/1996 | ........... G06F 18/214 |
| EP | 3910598 A1 | 11/2021 | |
| WO | 1997022087 A1 | 6/1997 | |

OTHER PUBLICATIONS

Raphael Grasset, et al, "ImageM Driven View Management for Augmented Reality Browsers," 2012 IEEE, 10 pages XP032309064.
Mikko Kuhna et al, Semi-automated magazine layout using content-based image features, MM "12: Proceedings of the 20th ACM international conference on Multimedia, Oct. 2012, total 10 pages.
Neel Rakholia, et al, "Where To Place: A Real-Time Visual Saliency Based Label Placement for Augmented Reality Applications," 2018, 5 pages. XP033454627.

* cited by examiner

IMAGE AND TEXT TYPESETTING METHOD AND RELATED APPARATUS THEREOF

CROSS-REFERENCE TO RELATED APPLICATIONS

This application is a U.S. National Stage of International Patent Application No. PCT/CN2020/076698 filed on Feb. 26, 2020, which claims priority to Chinese Patent Application No. 201910156945.5 filed on Mar. 1, 2019. Both of the aforementioned applications are hereby incorporated by reference in their entireties.

TECHNICAL FIELD

This application relates to the communications field, and in particular, to an image and text typesetting method and a related apparatus thereof.

BACKGROUND

When faced with a scene, humans automatically process areas they are interested in and selectively ignore areas they are uninterested in. These areas that the humans are interested in are referred to as salient areas. Image saliency is an important visual feature of an image and can be used to measure importance of image content. The image saliency is also a part of image segmentation. In computer vision, the image segmentation is a process of segmenting a digital image into a plurality of segments (pixel groups, also referred to as super pixels).

Plane typesetting often involves an image and a word. A best typesetting location of the word varies with content in the image. When the image is continuously updated, the best typesetting location of the word continuously changes accordingly. Currently, when the word is typeset, softie simple location determining operations can be performed based on saliency of the image to avoid a conflict between the image and the word. However, this typesetting manner is not necessarily the best in terms of a visual effect.

SUMMARY

A first aspect of this application provides an image and text typesetting method, specifically including:

determining importance measurement values of all pixels in an image, where the importance measurement value is a value for measuring importance of the pixel; obtaining at least one text box area formed by at least one text box placed on the image, where the text box is stacked on the image, text box areas corresponding to any two text boxes partially overlap, these text boxes on the image may completely cover the entire image, the text box area corresponding to the text box is an area range of a background image obtained by capturing the image by using a coordinate axis of the text box as a boundary, and it can be learned that the background image includes at least one pixel;

obtaining, through calculation based on importance measurement values of all the pixels in the background image corresponding to the text box area, an importance measurement value of the background image corresponding to the text box area, and repeatedly performing the operation to obtain importance measurement values of background images corresponding to all the text box areas;

in addition, calculating information about a balance degree of the text box area, calculating an importance measurement value gravity center or an importance measurement value mass center of the entire image by using the importance measurement values of the pixels in the entire image, and determining, based on a preset principle and a location relationship between the importance measurement value gravity center and a central area of the entire image or a location relationship between the importance measurement value mass center and a central area of the entire image, information about a balance degree of each text box area relative to the image, where the preset principle varies with the location relationship; and subsequently, selecting, from the at least one text box area based on the importance measurement value of the background image corresponding to the text box area and the information about the balance degree of the text box area, one text box area to typeset a word, where based on the importance measurement value, a text box area corresponding to a background image whose importance measurement value is as small as possible is selected, and based on the information about the balance degree of the text box area, a text box area whose balance degree is as high as possible is selected.

This embodiment of this application has the following advantages: The importance measurement value of each pixel in the image is determined. The at least one text box area formed by the at least one text box stacked on the image is obtained. Each text box area corresponds to one background image, and the background image includes at least one pixel. The importance measurement value of the background image corresponding to each text box area is obtained based on the importance measurement value of the pixel in the background image corresponding to each text box area. Then, the importance measurement value gravity center or the importance measurement value mass center of the entire image is determined. The information about the balance degree of each text box area is determined based on the preset principle and the location relationship between the importance measurement value gravity center or the importance measurement value mass center and the central area of the entire image. The balance degree of the text box area may be used to measure the balance degree of the text box area relative to the image. Next, one text box area is selected from the at least one text box area based on the information about the balance degree of the text box area and the importance measurement value of the background image corresponding to the text box area, to typeset the word. It can be learned that the importance measurement value of the background image corresponding to the text box area and the information about the balance degree of the text box area are comprehensively considered during word typesetting in this application. The text box area is selected based on the importance measurement value of the background image corresponding to the text box area. In this way, a problem of a conflict between the image and the word is considered. The text box area is selected based on the balance degree of the text box area. In this way, a problem of balance between the image and the word is considered. A combination of the two bases finally enhances a visual effect of image and text typesetting.

Based on the first aspect, in a first possible implementation of the first aspect, an importance measurement value of a background image corresponding to any text box area=a sum of importance measurement values of pixels in the background image corresponding to the text box area.

Alternatively, an importance measurement value of a background image corresponding to any text box area=a sum of importance measurement values of pixels in the background image corresponding to the text box area/a quantity of the pixels in the background image.

Alternatively, an importance measurement value of a background image corresponding to any text box area=a maximum value in importance measurement values of pixels in the background image corresponding to the text box area, or an importance measurement value of a background image corresponding to any text box area=a mode in importance measurement values of pixels in the background image corresponding to the text box area. More possible calculation manners are not described in detail one by one in this application.

In this embodiment, an example of a manner of calculating the importance measurement value of the background image corresponding to the text box area is described. This increases feasibility and diversity of the solution.

Based on any one of the first aspect and the first possible implementation of the first aspect, in a second possible implementation of the first aspect, the determining, based on a preset principle and a location relationship between the importance measurement value gravity center and a central area of the image or a location relationship between the importance measurement value mass center and a central area of the image, information about a balance degree of each text box area specifically includes:

When the importance measurement value gravity center falls within a central area range of the image, it indicates that the image is balanced. In this case, a terminal sets a balance degree value of a text box that is in the at least one text box and that is located on a central axis of the image to 1, and sets a balance degree of a text box at another location to 0.

When the importance measurement value gravity center falls outside the central area range of the image or even deviates greatly from the central area range of the image, the terminal calculates the information about the balance degree of each text box area based on the importance measurement value gravity center or the importance measurement value mass center by using a lever balancing principle, or the terminal calculates the information about the balance degree of each text box area based on the importance measurement value gravity center or the importance measurement value mass center by using a vector balancing principle.

In this embodiment, a manner of determining the information about the balance degree of the text box is described. This is conducive to implementing the solution.

Based on any one of the first aspect and the first to the second implementations of the first aspect, in a third possible implementation of the first aspect, the selecting, from the at least one text box area based on the importance measurement value of the background image corresponding to each text box area and the information about the balance degree of each text box area, one text box area to typeset a word includes:

determining a weighting calculation result of each text box area in a weighting calculation manner by using the importance measurement value of the background image corresponding to each text box area and the information about the balance degree of each text box area as parameters; and selecting a text box whose weighting calculation result has a maximum value as the text box to typeset the word.

Based on any one of the first aspect and the first to the second implementations of the first aspect, in a fourth possible implementation of the first aspect, the importance measurement value is obtained by weighting a saliency value and any one or more of a facial recognition result, an object recognition result, and semantic information; or the importance measurement value is obtained by weighting a saliency segmentation result and any one or more of a facial recognition result and an object recognition result; or the importance measurement value is specifically a saliency value.

In this embodiment, a larger saliency value indicates that a background image is more easily observed. In addition, generally, a larger importance measurement value indicates a larger saliency value of image content. Therefore, a text box with a saliency value as small as possible is selected, to avoid covering the image content by the text box.

Based on any one of the first aspect and the first to the second implementations of the first aspect, in a fifth possible implementation of the first aspect, a color feature of a target background image is determined based on an image feature, an information entropy, a saliency value, or a color distribution of the target background image corresponding to the text box area in which the word is located.

Whether the color feature is a mottled color feature is determined. If yes, a mask is added to a background of the word, where a size of an area to which the mask is added is determined by a size of the text box area.

In this embodiment, adding the mask to the background of the word is more conducive to enhancing the visual effect.

Based on the fifth implementation of the first aspect, in the fifth implementation of the first aspect, the method further includes:

determining a dominant color of the target background image corresponding to the text box area in which the word is located, obtaining a highlight color and a shadow color through dark-level calculation by using the dominant color, determining lightness of the target background image, and therefore, setting a text in the text box area in which the word is located to the highlight color or the shadow color with reference to the lightness, and when the mask is added to the background of the word, setting a text area to the highlight color or the shadow color with reference to the lightness.

In this embodiment, the text in the text box area and a color of a mask area are set based on the lightness of the target background image, to further enhance the visual effect of image and text typesetting.

A second aspect of this application provides a terminal, and the terminal has a function performed by the terminal in any one of the first aspect or the implementations of the first aspect. This function may be implemented by using corresponding software or hardware. The terminal may include one or more units corresponding to the function.

A third aspect of this application provides a terminal, including a memory, a transceiver, a processor, and a bus system.

The memory is configured to store a program and instructions.

The transceiver is configured to receive or send information under control of the processor.

The processor is configured to execute the program in the memory.

The bus system is configured to connect the memory, the transceiver, and the processor, to enable the memory, the transceiver, and the processor to communicate with each other.

The processor is configured to invoke the program and the instructions in the memory to perform all or some of the steps of the method according to the first aspect.

A fourth aspect of the embodiments of this application provides a computer storage medium. The computer storage medium includes operation instructions, and when the operation instructions are run on a computer, the computer is enabled to perform the method according to any one of the first aspect and the implementations of the first aspect.

A fifth aspect of the embodiments of this application provides a computer program product. When the computer program product runs on a computer, the computer is enabled to perform the method according to any one of the first aspect and the implementations of the first aspect.

DESCRIPTION OF EMBODIMENTS

This application may be applied to image and text typesetting of a magazine lock screen, or may be applied to image and text typesetting of a poster advertisement and the like that have a relatively high visual effect requirement, or may be applied to image and text typesetting of a sharing card such as a book list, a playlist, or an album contact. More applicable scenarios are not limited herein.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "have" and any other variants mean to cover the non-exclusive inclusion, for example, a process, method, system, product, or device that includes a list of steps or units is not necessarily limited to those expressly listed steps and units, but may include other steps or units not expressly listed or inherent to such a process, method, system, product, or device.

Figure 1:
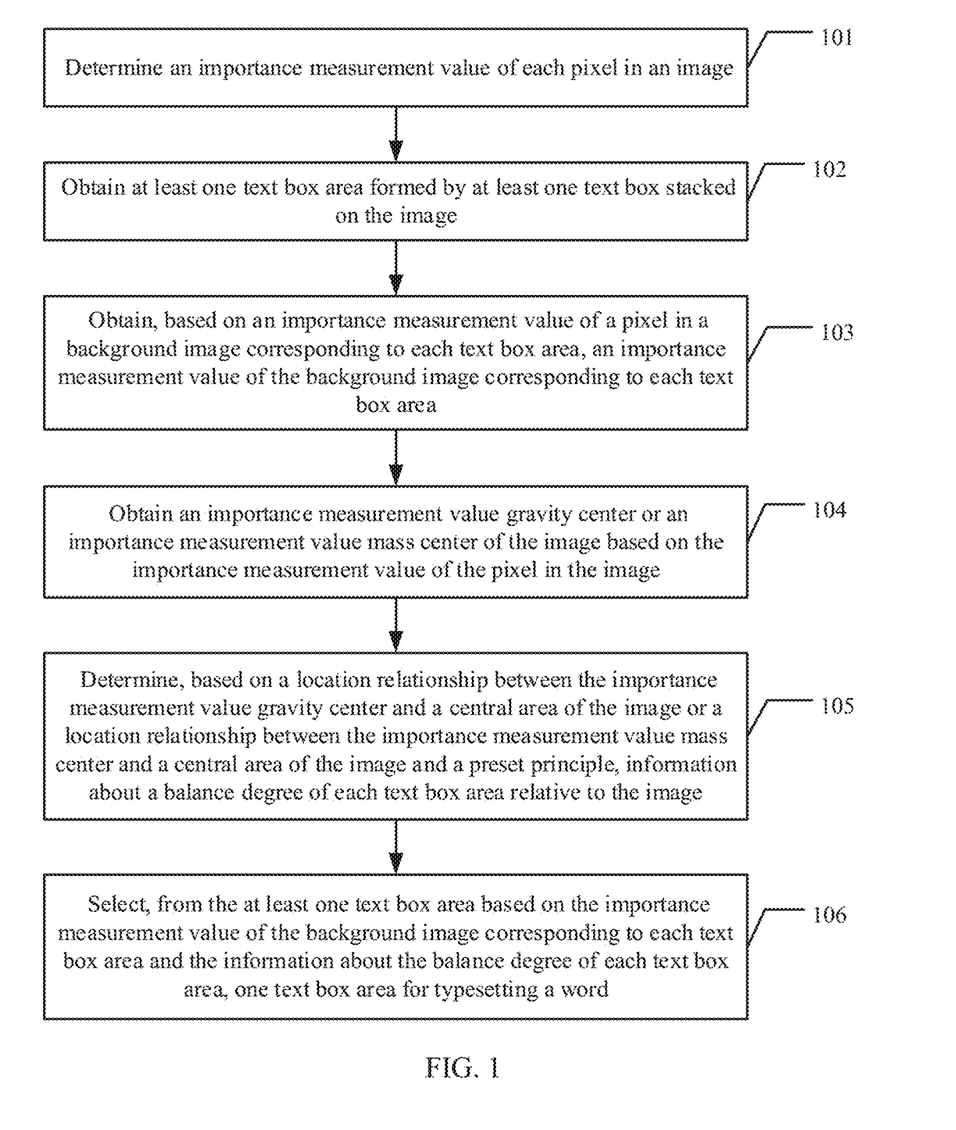
FIG. 1 is a schematic diagram of an embodiment of an image and text typesetting method according to this application.

In a scenario in which image content such as a lock screen of a terminal changes continuously, if a single image and text typesetting manner is set on the terminal, when the image content changes, it is definitely inappropriate if a location of a word is fixed. Currently, there is a solution for performing image and text typesetting based on saliency (saliency) of an image, so that the word may be typeset in an area with relatively low saliency in the image, to avoid covering the image content by the word. However, in this typesetting manner, a visual effect is not very good, and user experience is poor. Based on this, this application discloses an image and text typesetting method, and a problem of balance between the image content and the word is considered. Referring to FIG. 1, a specific implementation is as follows.

101: Determine an importance measurement value of each pixel in an image.

An image has a plurality of pixels. After obtaining the image, a terminal determines an importance measurement value of each pixel in the image. The importance measurement value is used to measure importance of the pixel. The importance measurement value may be specifically a saliency value. Generally, a higher saliency value of a pixel indicates that the pixel is more salient and is more easily observed by a user. The saliency value may be a coherent saliency value or a saliency segmentation result. For example, a grayscale value of the pixel in the image is set to 0 or 255. A pixel whose grayscale value is larger has a larger saliency value and is more easily observed. The importance measurement value may alternatively be obtained by weighting the saliency value and any one or more of a facial recognition result and a final result. The final result is obtained after an object recognition result is sorted based on a specific object label or a semantic label. For example, weighting calculation is performed on a saliency map (saliency map) of the image and semantic information, facial information, and the like of the image to obtain the importance measurement value of each pixel.

Figure 2:
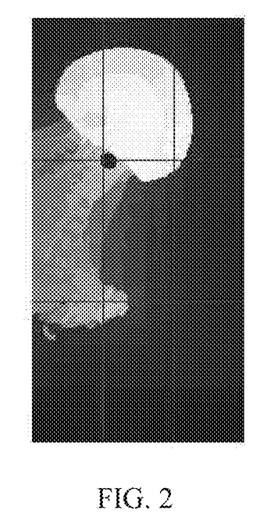
FIG. 2 is a diagram of a binarization result of an image according to this application.

FIG. 2 is a diagram of a saliency result of an image according to this application. It can be learned that some pixels of a jellyfish in the image have relatively large grayscale values, are relatively easily observed, and therefore have relatively large saliency values.

102: Obtain at least one text box area formed by at least one text box stacked on the image.

The text box area in this application refers to a text box stacked on an image interface. There may be a plurality of text boxes. Each text box has one text box area, and the text box area may be considered as an area range corresponding to a partial image obtained after the image is captured by using coordinate axes of the text box as four boundaries. It can be learned that the area range is smaller than an area range corresponding to the entire image. The obtained partial image is referred to as a background image corresponding to the text box area in this application. The background image corresponding to the text box area includes M pixels, and M is a positive integer greater than 0, Because the text boxes are stacked, background images corresponding to text box areas may partially overlap.

103: Obtain, based on an importance measurement value of a pixel in a background image corresponding to each text box area, an importance measurement value of the background image corresponding to each text box area.

The importance measurement value of the background image corresponding to each text box area may be obtained through calculation based on the importance measurement value of the pixel in the background image. Specifically, there are the following several possible cases.

The importance measurement value of the background image corresponding to the text box area may be equal to a sum of the importance measurement values of the pixels in the background image, or the importance measurement value of the background image corresponding to the text box area is equal to a sum of the importance measurement values of the pixels in the background image/a quantity of the pixels in the background image, or an importance measurement value of the text box area is equal to a maximum value in the importance measurement values of all the pixels in the background image, or an importance measurement value of the text box area is equal to a mode in the importance measurement values of the pixels in the background image. More possible cases are not listed herein one by one.

A text box area with an importance measurement value as small as possible is selected. A smaller importance measurement value indicates a smaller saliency value, and the smaller saliency value indicates lower saliency and that image content is more difficult to be covered. For example, a saliency value of the jellyfish in FIG. 2 is relatively large, a text box area with a small saliency value is selected, to avoid covering the jellyfish by a word.

104: Obtain an importance measurement value gravity center or an importance measurement value mass center of the image based on the importance measurement value of the pixel in the image.

The importance measurement value gravity center or the importance measurement value mass center of the entire image is determined. The importance measurement value gravity center represents a gravity center, of the image, that is obtained through calculation based on the importance measurement value of each pixel in the entire image. The importance measurement value mass center represents a mass center, of the image, that is obtained through calculation based on the importance measurement value of each pixel in the entire image.

105: Determine, based on a preset principle and a location relationship between the importance measurement value gravity center and a central area of the image or a location relationship between the importance measurement value mass center and a central area of the image, information about a balance degree of each text box area relative to the image.

A central area range of the image is first determined, and the central area range may be a circle or ellipse whose center is a central point of the image.

Figure 3:
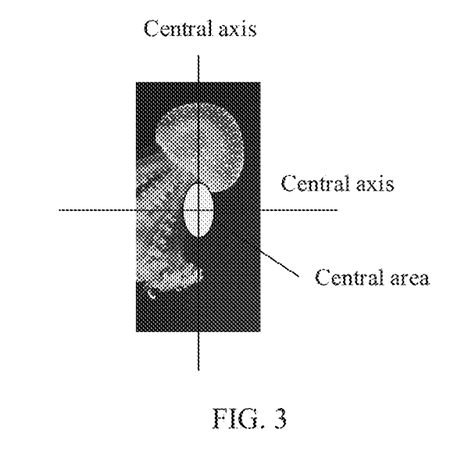
FIG. 3 is a schematic diagram of a central area and a central axis of an image according to this application.

In this embodiment, a balance degree of a text box area is used to indicate a balance degree of the text box area relative to the image. When the importance measurement value gravity center of the image is located in the central area range of the image, or the importance measurement value mass center is located in the central area range of the image, it indicates that the image is self-balanced. In this case, balance degree values of text boxes located on a horizontal central axis and a longitudinal central axis of the image are set to 1, and a balance degree value of a text box at another location is set to 0. A schematic diagram of the central axes of the image and the central area of the image is shown in FIG. 3.

If the importance measurement value gravity center of the image is located outside the central area range of the image or even deviates greatly from the central area range of the image, or the importance measurement value mass center of the image is located outside the central area range of the image or even deviates greatly from the central area range of the image, to form visual balance between the image and the word, a balance degree value of the text box area needs to be obtained through calculation based on the importance measurement value gravity center of the image and a vector balancing principle or a lever balancing principle, or a balance degree value of the text box area needs to be obtained through calculation based on the importance measurement value mass center of the image and a vector balancing principle or a lever balancing principle. A specific calculation manner of obtaining the balance degree value of the text box area through calculation based on the vector balancing principle or the lever balancing principle is as follows:

The vector balancing principle is specifically as follows: A first vector is formed from coordinates of a geometric center of a text box to coordinates of a central point of an image. A second vector is formed from coordinates of an importance measurement value mass center of the image to the coordinates of the central point of the image (or a second vector is formed from coordinates of an importance measurement value gravity center of the image to the coordinates of the central point of the image). A balance degree value of the text box is determined based on values and directions of the two vectors. When the two vectors are equal in value and opposite in direction, a maximum balance degree of the text box is 1, and in another case, the balance degree ranges from 0 to 1. It may be understood that a value range 0 to 1 herein is merely an example, the value may alternatively range from 0 to 100, and more value ranges are not limited herein.

The lever balancing principle is specifically as follows: A distance from a geometric center of a text box to a central point of an image is a first arm of force. A distance from an importance measurement value mass center of the image to the central point of the image is a second arm of force (or a distance from an importance measurement value gravity center of the image to the central point of the image is a second arm of force). Text box mass=preset text box density×a text area. Image mass is obtained through calculation by using image saliency segmentation. When the first arm of force×the text box mass=the second arm of force×the image mass, a maximum balance degree of the text box is 1, and in another case, the balance degree ranges from 0 to 1. It may be understood that a value range 0 to 1 herein is merely an example, and more value ranges are not limited herein.

Herein, the balance degree of the text box area may be determined based on another image balancing principle in addition to the vector balancing principle and the lever balancing principle. This is not limited in this application.

Figure 4:
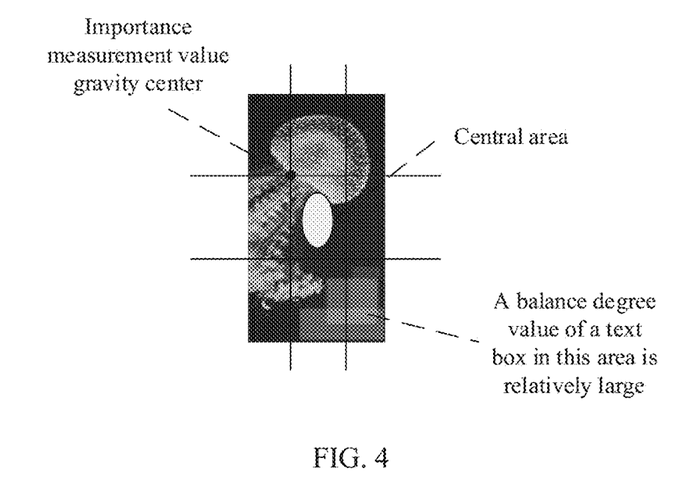
FIG. 4 is a possible case of selecting a text box according to this application.

It is found, after the balance degree value of the text box is determined based on the lever balancing principle or the vector balancing principle, that when the importance measurement value gravity center (or the importance measurement value mass center) of the image is located at an upper left part of the image, a balance degree value of a text box area at a lower right part of the image is relatively large; when the importance measurement value gravity center (or the importance measurement value mass center) of the image is located at an upper right part of the image, a balance degree value of a text box area at a lower left part of the image is relatively large; and similarly, when the importance measurement value gravity center or the importance measurement value mass center of the image is located in another direction, a balance degree value of a text box area in a direction opposite to the importance measurement value gravity center or the importance measurement value mass center of the image is relatively large. Referring to FIG. 4, the central area of the image is shown as an ellipse in the figure. The importance measurement value gravity center of the image is located outside the central area of the image, and the importance measurement value gravity center of the image is located at the upper left part. In this case, a balance degree value of a text box in a lower right area is relatively large, and a text box area is preferentially selected in this area to typeset a word.

In this embodiment, a text box area balanced with the image is preferentially selected to typeset the word, so that typesetting of the image and the word may generate visual balance, thereby improving user experience.

106: Select, from the at least one text box area based on the importance measurement value of the background image corresponding to each text box area and the information about the balance degree of each text box area, one text box area to typeset the word.

Weighting calculation is performed on a balance degree priority of the text box area and the importance measurement value of the text box area to obtain a calculation result, and then the text box area is selected based on the calculation result to typeset the word. For example:

a weighting calculation result of the text box=

A×an importance measurement value of the text box +, where values of A and B are B×the balance degree value of the text box preset by the terminal based on an actual situation.

It can be learned that the importance measurement value of the text box area is considered when the text box area is selected to typeset the word in this application. Therefore, a text box area with a relatively small saliency value may be selected to avoid covering the image content. In addition, a balance degree between the text box area and the image is considered, so that the visual balance can be ensured. A best visual effect of the text box area is obtained by combining the importance measurement value and the balance degree, and user experience is improved.

Further, in this application, whether a mask needs to be added to a background of the word may be further determined. Details are as follows.

Figure 5:
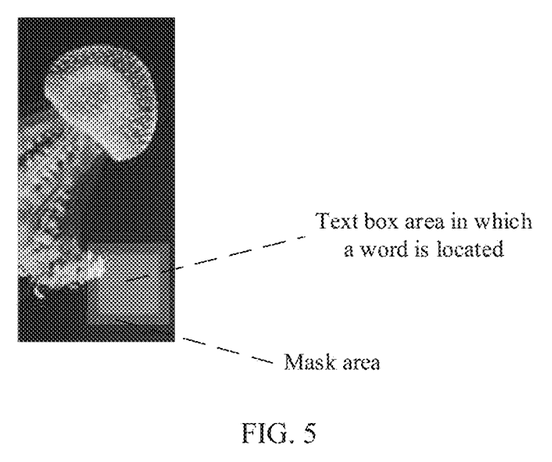
FIG. 5 is a schematic diagram of a mask area according to this application.

A color feature of a background image corresponding to a text box area in which the word is located is determined based on an image feature, an information entropy, a saliency value, or a color distribution of the background image corresponding to the text box area in which the word is located. The image feature is specifically a color feature of the image. When the color feature of the background image corresponding to the text box area is a preset color feature of a mottled type, the mask is added to the background of the word. It should be noted that a size of an area to which the mask is added is determined by a size of the text box area. Generally, a mask area is larger than the text box area but smaller than an area in which the entire image is located. For example, as shown in FIG. 5, a lower right text box is selected to typeset the word, and the mask area is slightly larger than the text box area.

Further, in this application, a dominant color of the background image corresponding to the text box area in which the word is located may further be determined, and a shadow color and a highlight color are derived from the determined dominant color in a dark-level calculation manner in HSV (Hue, Saturation, Value) or LCH (lightness, chroma, hue) space.

Lightness of the background image corresponding to the text box area in which the word is located is determined. Then, a text in the text box is set to the highlight color or the shadow color based on the lightness. If the mask is added, the mask area may further be set to the highlight color or the shadow color. Specifically, when the lightness of the background image corresponding to the text box area in which the word is located belongs to a preset lighter chroma set, whether the mask is added to the background of the word is further determined. If the mask is added to the background of the word, the text in the text box is set to the shadow color, and the mask area is set to the highlight color. If the mask is not added to the background of the word, the text in the text box area is set to the shadow color. When the lightness of the background image corresponding to the text box area in which the word is located belongs to a preset darker chroma set, whether the mask is added to the background of the word is further determined. If the mask is added to the background of the word, the text in the text box is set to the highlight color, and the mask area is set to the shadow color, if the mask is not added to the background of the word, the text in the text box area is set to the highlight color. A better visual effect can be achieved in the foregoing setting manner.

Figure 6:
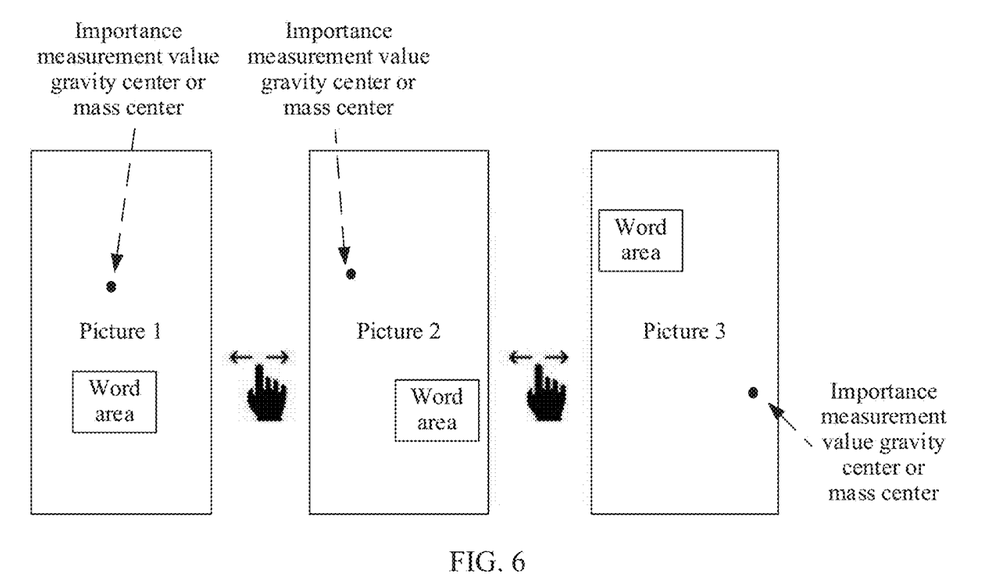
FIG. 6 is a possible application scenario according to this application.

FIG. 6 shows lock screen pictures of the terminal. The user may browse the pictures through flicking. The terminal may also dynamically update the pictures in real time based on stored pictures. For each picture, a text box area with a best visual effect is selected based on an image and text typesetting principle of this application, to typeset a word.

Figure 7:
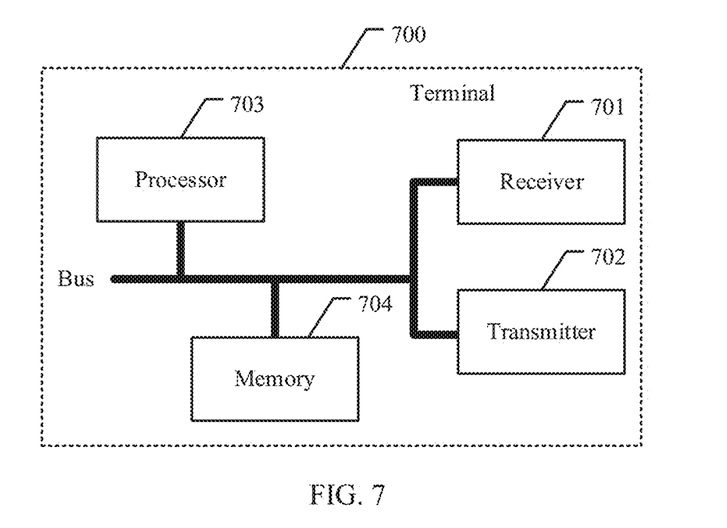
FIG. 7 is a possible structure of a terminal according to this application.

The image and text typesetting method in this application is described above. Referring to FIG. 7, a structure of the terminal in this application is described. A terminal 700 includes:

a receiver 701, a transmitter 702, a processor 703, and a memory 704 (there may be one or more processors 703 in the terminal 700, and one processor is used as an example in FIG. 7), where in some embodiments of this application, the receiver 701, the transmitter 702, the processor 703, and the memory 704 may be connected through a bus or in another manner, and in FIG. 7, a bus connection is used as an example.

The memory 704 may include a read-only memory and a random access memory, and provide instructions and data to the processor 703. A part of the memory 704 may further include a non-volatile random access memory (English full name: non-volatile random access memory, NVRAM for short). The memory 704 stores an operating system and operation instructions, an executable module or a data structure, a subset thereof, or an extended set thereof. The operation instructions may include various operation instructions, used to implement various operations. The operating system may include various system programs, to implement various basic services and process hardware-based tasks.

The processor 703 controls an operation of a network device, and the processor 703 may also be referred to as a central processing unit (English full name: central processing unit, CPU for short). In a specific application, components of the network device are coupled together through a bus system. In addition to a data bus, the bus system may further include a power bus, a control bus, a status signal bus, and the like. However, for clear description, various types of buses in the figure are referred to as the bus system.

The method disclosed in the foregoing embodiment of this application may be applied to the processor 703, or may be implemented by the processor 703. The processor 703 may be an integrated circuit chip and has a signal processing capability. In an implementation process, steps in the foregoing method can be implemented by using a hardware integrated logical circuit in the processor 703, or by using instructions in a form of software. The processor 703 may be a general-purpose processor, a digital signal processor (English full name: digital signal processing, DSP for short), an application-specific integrated circuit (English full name: application specific integrated circuit, ASIC tar short), a field programmable gate array (English full name: field-programmable gate array, FPGA for short) or another programmable logical component, a discrete gate or transistor logic device, or a discrete hardware component. The processor 703 may implement or perform the method, the steps, and logical block diagrams that are disclosed in the embodiments of this application. The general-purpose processor may be a microprocessor, or the processor may be any conventional processor or the like. Steps of the method disclosed with reference to the embodiments of this application may be directly executed and accomplished by a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 704, and the processor 703 reads information in the memory 704 and completes the steps in the foregoing method in combination with hardware of the processor.

The receiver 701 may be configured to receive input digit or character information, and generate signal input related to a related setting and function control of the network device. The transmitter 702 may include a display device such as a display. The transmitter 702 may be configured to output digit or character information through an external interface.

In this embodiment of this application, the processor 703 is configured to perform the foregoing method.

Figure 8:
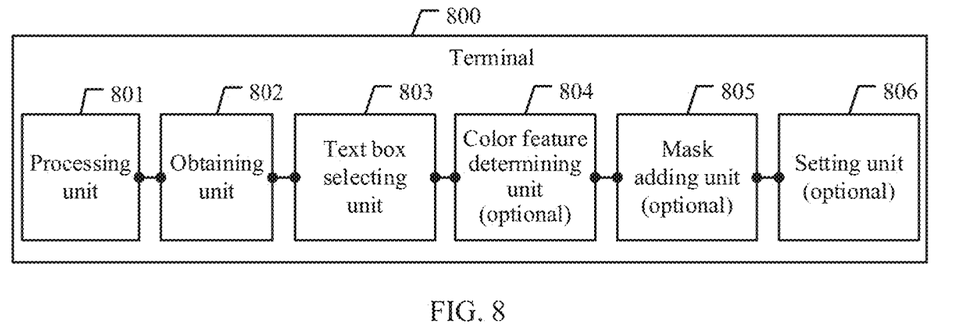
FIG. 8 is another possible structure of a terminal according to this application.

Referring to FIG. 8, another structure of the terminal in this application is described. A terminal 800 includes:

a processing unit 801, configured to determine an importance measurement value of a pixel in an image;

an obtaining unit 802, configured to obtain at least one text box area formed by at least one text box stacked on the image, where the text box area is an area range of a background image obtained after the image is captured by using a coordinate axis of the text box as a boundary, and a background image corresponding, to each of the at least one text box area includes at least one pixel, where the processing unit 801 is further configured to obtain, based on an importance measurement value of the pixel in the background image corresponding to each text box area, an importance measurement value of the background image corresponding to each text box area, the processing unit 801 is configured to obtain an importance measurement value gravity center or an importance measurement value mass center of the image based on the importance measurement value of the pixel in the image, and the processing unit 801 is further configured to determine, based on a preset principle and a location relationship between the importance measurement value gravity center and a central area of the image or a location relationship between the importance measurement value mass center and a central area of the image, information about a balance degree of each text box area relative to the image; and a text box selecting unit 803, configured to select, from the at least one text box area based on the importance measurement value of the background image corresponding to each text box area and the information about the balance degree of each text box area, one text box area to typeset a word.

Optionally, the importance measurement value of the background image corresponding to the text box area a sum of the importance measurement values of the pixels in the background image.

Alternatively, the importance measurement value of the background image corresponding to the text box area=a sum of the importance measurement values of the pixels in the background image/a quantity of the pixels in the background image.

Alternatively, the importance measurement value of the background image corresponding to the text box area=a maximum value or a mode in the importance measurement values of the pixels in the background image.

Optionally, the processing unit 801 is specifically configured to: when the importance measurement value gravity center is located in a central area range of the image, or the importance measurement value mass center is located in a central area range of the image, set a balance degree value of a text box area located on a central axis of the image to 1, and set a balance degree value of a text box area that is not located on the central axis of the image to 0, where the text box area located on the central axis of the image and the text box area that is not located on the central axis of the image belong to the at least one text box area; and when the importance measurement value gravity center is not located in the central area range of the image, or the importance measurement value mass center is not located in the central area range of the image, obtain the balance degree value of each text box area based on a vector balancing principle or a lever balancing principle.

Optionally, the text box selecting unit 803 is specifically configured to:

weight the importance measurement value of the background image corresponding to the text box area and the balance degree value of the text box area to obtain a weighting result, and repeatedly performing the operation until a weighting result of each text box area is obtained; and select, from the at least one text box area based on the weighting result of each text box area, one text box area to typeset the word.

Optionally, the importance measurement value is obtained by weighting a saliency value and any one or more of a facial recognition result, an object recognition result, and semantic information. Alternatively, the importance measurement value is obtained by weighting a saliency segmentation result and any one or more of a facial recognition result, an object recognition result, and semantic information. Alternatively, the importance measurement value is specifically a saliency value.

Optionally, the terminal further includes:

a color feature determining unit 804, configured to determine, based on an image feature, an information entropy, a saliency value, or a color distribution of a target background image corresponding to the text box area in which the word is located, a color feature of the target background image; and a mask adding unit 805, configured to: when the color feature belongs to a preset mottled color feature set, add a mask to a background of the word, where a mask area is preset based on the text box area.

Optionally, the processing unit 801 is further configured to: determine a dominant color of the target background image;

obtain a highlight color and a shadow color by using a dark-level calculation method and the dominant color; and determine lightness of the target background image.

The terminal further includes:

a setting unit 806, configured to: set the mask area to the highlight color or the shadow color based on the lightness, and set, based on the lightness, a text in the text box area in which the word is located to the highlight color or the shadow color.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and details are not described herein again.

In addition, it should be noted that the apparatus embodiments are merely examples. The modules described as separate parts may or may not be physically separate, and modules displayed as units may or may not be physical units, may be located in one position, or may be distributed on a plurality of network units. Some or all the modules may be selected according to an actual need to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. Based on such an understanding, the technical solutions of this application essentially or the part contributing to the conventional technology may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or a compact disc of a computer, and includes several instructions for instructing a computer device (which may be a personal computer, a server, a network device, or the like) to perform the method described in the embodiments of this application.

The computer program product includes one or more computer instructions. When the computer program instructions are loaded and executed on a computer or a processor of the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An image and text typesetting method implemented by a processor, comprising:
    determining a first importance measurement value of a pixel in an image;
    obtaining at least one text box area formed by at least one text box stacked on the image, wherein the at least one text box area is an area range of a background image, and wherein the background image comprises the pixel;
    obtaining, based on the first importance measurement value, a second importance measurement value of the background image corresponding to the at least one text box area;
    obtaining an importance measurement value gravity center or an importance measurement value mass center of the image based on the first importance measurement value, wherein the importance measurement value gravity center or the importance measurement value mass center represents a gravity center or a mass center of the image respectively, and wherein the gravity center or the mass center represents a focal point of the image based on a saliency value of the pixel;
    determining, based on a preset principle and either based on a location relationship between the importance measurement value gravity center and a central area of the image or a location relationship between the importance measurement value mass center and the central area of the image, information about a first balance degree value of each text box area relative to the image, wherein the preset principle comprises a vector balancing principle, and wherein the first balance degree value is set to one when the importance measurement value gravity center or the importance measurement value mass center is located in a central area range of the image; and
    selecting, from the at least one text box area based on the second importance measurement value and the information about the first balance degree value, a first text box area to typeset a word.

2. The image and text typesetting method of claim 1, wherein the second importance measurement value of the background image comprises a sum of importance measurement values of pixels in the background image, a sum of importance measurement values of pixels in the background image divided by a quantity of the pixels in the background image, or a maximum value in importance measurement values of pixels in the background image.

3. The image and text typesetting method of claim 1, further comprising:
    setting a second balance degree value of a second text box area located on a central axis of the image to 1, and setting a third balance degree value of a third text box area that is not located on the central axis to 0 when the importance measurement value gravity center is located in a central area range of the image or the importance measurement value mass center is located in the central area range, wherein the second text box area and the third text box area belong to the at least one text box area; and
    obtaining the first balance degree value of each text box area based on the vector balancing principle when the importance measurement value gravity center is not located in the central area range or the importance measurement value mass center is not located in the central area range.

4. The image and text typesetting method of claim 1, further comprising:
- weighting the second importance measurement value of the background image and the first balance degree value to obtain a weighting result of the at least one text box area; and
- selecting, from the at least one text box area based on the weighting result, the first text box area to typeset the word.

5. The image and text typesetting method of claim 1, further comprising:
- obtaining the second importance measurement value by weighting the saliency value and one or more of a facial recognition result and an object recognition result; or
- obtaining the second importance measurement value by weighting a saliency segmentation result and one or more of a facial recognition result and an object recognition result.

6. The image and text typesetting method of claim 1, further comprising:
- determining a color feature of a target background image based on an image feature, an information entropy, the saliency value, or a color distribution of the target background image corresponding to the first text box area comprising the word; and
- adding a mask to a background of the word when the color feature belongs to a preset mottled color feature set, wherein a mask area is preset based on the first text box area.

7. The image and text typesetting method of claim 6, further comprising:
- determining a dominant color of the target background image;
- obtaining a highlight color and a shadow color using a dark-level calculation method and the dominant color;
- determining lightness of the target background image;
- setting the mask area to the highlight color or the shadow color based on the lightness; and
- setting, based on the lightness, a text in the first text box area to the highlight color or the shadow color.

8. A terminal comprising:
- a memory configured to store instructions; and
- a processor coupled to the memory, wherein the instructions cause the processor to be configured to:
  - determine a first importance measurement value of a pixel in an image;
  - obtain at least one text box area formed by at least one text box stacked on the image, wherein the at least one text box area is an area range of a background image, and wherein the background image comprises the pixel;
  - obtain, based on the first importance measurement value, a second importance measurement value of the background image corresponding to each of the at least one text box area;
  - obtain an importance measurement value gravity center or an importance measurement value mass center of the image based on the first importance measurement value, wherein the importance measurement value gravity center or the importance measurement value mass center represents a gravity center or a mass center of the image respectively, and wherein the gravity center or the mass center represents a focal point of the image based on a saliency value of the pixel;
  - determine, based on a preset principle and either based on a location relationship between the importance measurement value gravity center and a central area of the image or a location relationship between the importance measurement value mass center and the central area of the image, information about a first balance degree value of each text box area relative to the image, wherein the preset principle comprises a vector balancing principle, and wherein the first balance degree value is set to one when the importance measurement value gravity center or the importance measurement value mass center is located in a central area range of the image; and
  - select, from the at least one text box area based on the second importance measurement value and the information about the first balance degree value, a first text box area to typeset a word.

9. The terminal of claim 8, wherein the second importance measurement value of the background image comprises a sum of importance measurement values of pixels in the background image, a sum of importance measurement values of pixels in the background image divided by a quantity of the pixels in the background image, or a maximum value in importance measurement values of pixels in the background image.

10. The terminal of claim 8, wherein the instructions further cause the processor to be configured to:
- set a second balance degree value of a second text box area located on a central axis of the image to 1, and set a third balance degree value of a third text box area that is not located on the central axis to 0 when the importance measurement value gravity center is located in a central area range of the image or the importance measurement value mass center is located in the central area range, wherein the second text box area and the third text box area belong to the at least one text box area; and
- obtain the first balance degree value of each text box area based on the vector balancing principle when the importance measurement value gravity center is not located in the central area range or the importance measurement value mass center is not located in the central area range.

11. The terminal of claim 8, wherein the instructions further cause the processor to be configured to:
- weight the second importance measurement value of the background image and the first balance degree value to obtain a weighting result of the at least one text box area; and
- select, from the at least one text box area based on the weighting result, the first text box area to typeset the word.

12. The terminal of claim 8, wherein the instructions further cause the processor to be configured to:
- obtain the second importance measurement value by weighting the saliency value and one or more of a facial recognition result and an object recognition result; or
- obtain the second importance measurement value by weighting a saliency segmentation result and one or more of a facial recognition result and an object recognition result.

13. The terminal of claim 8, wherein the instructions further cause the processor to be configured to:
- determine a color feature of a target background image based on an image feature, an information entropy, the saliency value, or a color distribution of the target background image corresponding to the first text box area comprising the word; and add a mask to a background of the word when the color feature belongs to a preset mottled color feature set, wherein a mask area is preset based on the first text box area.

14. The terminal of claim 13, wherein the instructions further cause the processor to be configured to:
determine a dominant color of the target background image;
obtain a highlight color and a shadow color using a dark-level calculation method and the dominant color;
determine lightness of the target background image;
set the mask area to the highlight color or the shadow color based on the lightness; and
set, based on the lightness, a text in the first text box area to the highlight color or the shadow color.

15. A computer program product comprising computer-executable instructions stored on a non-transitory computer-readable medium that, when executed by a processor, cause a terminal to:
determine a first importance measurement value of a pixel in an image;
obtain at least one text box area formed by at least one text box stacked on the image, wherein the at least one text box area is an area range of a background image of the image, and wherein the background image corresponds to the at least one text box area comprising the pixel;
obtain, based on the first importance measurement value, a second importance measurement value of the background image corresponding to the at least one text box area;
obtain an importance measurement value gravity center or an importance measurement value mass center of the image based on the first importance measurement value, wherein the importance measurement value gravity center or the importance measurement value mass center of the image represents a gravity center or a mass center of the image respectively, and wherein the gravity center or the mass center represents a focal point of the image based on a saliency value of the pixel;
determine, based on a preset principle and either based on a location relationship between the importance measurement value gravity center and a central area of the image or a location relationship between the importance measurement value mass center and the central area, information about a first balance degree value of each text box area relative to the image, wherein the preset principle comprises a vector balancing principle, and wherein the first balance degree value is set to one when the importance measurement value gravity center or the importance measurement value mass center is located in a central area range of the image; and
select, from the at least one text box area based on the second importance measurement value and the information about the first balance degree value, a first text box area to typeset a word.

16. The computer program product of claim 15, wherein the computer-executable instructions further cause the terminal to:
set a second balance degree value of a second text box area located on a central axis of the image to 1, and set a third balance degree value of a third text box area that is not located on the central axis to 0 when the importance measurement value gravity center is located in a central area range of the image or the importance measurement value mass center is located in the central area range, wherein the second text box area and the third text box area belong to the at least one text box area; and
obtain the first balance degree value of each text box area based on the vector balancing principle when the importance measurement value gravity center is not located in the central area range or the importance measurement value mass center is not located in the central area range.

17. The computer program product of claim 15, wherein the computer-executable instructions further cause the terminal to:
weight the second importance measurement value of the background image and the first balance degree value to obtain a weighting result of the at least one text box area; and
select, from the at least one text box area based on the weighting result, the first text box area to typeset the word.

18. The computer program product of claim 15, wherein the computer-executable instructions further cause the terminal to:
obtain the second importance measurement value by weighting the saliency value and one or more of a facial recognition result and an object recognition result; or
obtain the second importance measurement value by weighting a saliency segmentation result and one or more of a facial recognition result and an object recognition result.

19. The computer program product of claim 15, wherein the computer-executable instructions further cause the terminal to:
determine a color feature of a target background image based on an image feature, an information entropy, the saliency value, or a color distribution of the target background image corresponding to the first text box area comprising the word; and
add a mask to a background of the word when the color feature belongs to a preset mottled color feature set, wherein a mask area is preset based on the first text box area.

20. The computer program product of claim 19, wherein the computer-executable instructions further cause the terminal to:
determine a dominant color of the target background image;
obtain a highlight color and a shadow color using a dark-level calculation method and the dominant color;
determine lightness of the target background image;
set the mask area to the highlight color or the shadow color based on the lightness; and
set, based on the lightness, a text in the first text box area to the highlight color or the shadow color.

* * * * *